(12) United States Patent
Ishida et al.

(10) Patent No.: US 6,620,738 B2
(45) Date of Patent: *Sep. 16, 2003

(54) ETCHANT AND METHOD FOR FABRICATING A SEMICONDUCTOR DEVICE USING THE SAME

(75) Inventors: Hidetoshi Ishida, Kyoto (JP); Atsushi Noma, Takatsuki (JP); Daisuke Ueda, Ibaraki (JP)

(73) Assignee: Matsushita Electronics Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

(21) Appl. No.: 09/484,473

(22) Filed: Jan. 18, 2000

(65) Prior Publication Data

US 2001/0044208 A1 Nov. 22, 2001

Related U.S. Application Data

(62) Division of application No. 09/116,725, filed on Jul. 16, 1998, now abandoned.

(30) Foreign Application Priority Data

Jul. 16, 1997 (JP) .............................. 9-191179

(51) Int. Cl.[7] .......................................... H01L 21/302
(52) U.S. Cl. ...................... 438/745; 438/747; 438/750; 438/753
(58) Field of Search ................................ 438/750, 745, 438/747, 753, 754, 756; 252/79.1, 79.2, 79.5; 156/345

(56) References Cited

U.S. PATENT DOCUMENTS

| 3,777,227 A | * | 12/1973 | Krishma et al. ............ 317/235 |
| 4,759,823 A | * | 7/1988 | Asselanis et al. ........... 156/345 |
| 5,256,247 A | * | 10/1993 | Watanabe et al. ........... 156/653 |
| 5,350,448 A | | 9/1994 | Dietz et al. ................. 106/441 |
| 5,402,807 A | * | 4/1995 | Moore et al. ................. 134/61 |
| 5,445,979 A | | 8/1995 | Hirano ......................... 437/41 |
| 5,587,046 A | | 12/1996 | Stadler et al. ........... 156/662.1 |
| 5,828,129 A | * | 10/1998 | Roh ............................. 257/751 |

* cited by examiner

Primary Examiner—Benjamin L. Utech
Assistant Examiner—Lan Vinh
(74) Attorney, Agent, or Firm—RatnerPrestia

(57) ABSTRACT

An etchant for etching at least one of a titanium material and silicon oxide includes a mixed liquid of HCl, $NH_4F$ and $H_2O$. When the etchant has a $NH_4F/HCl$ molar ratio of less than one, only the titanium material is etched. When the etchant has a $NH_4F/HCl$ molar ratio of more than one, only silicon oxide is etched. When the etchant has a $NH_4F/HCl$ molar ratio of one, the titanium material and silicon oxide are etched at the same rate.

4 Claims, 5 Drawing Sheets

ETCHANT AND METHOD FOR FABRICATING A SEMICONDUCTOR DEVICE USING THE SAME

This application is a divisional of U.S. patent application Ser. No. 09/116,725 filed on Jul. 16, 1998 and now abandoned.

BACKGROUND OF THE INVENTION

1. Field of the Invention

The present invention relates to an etchant for etching at least one of a titanium material and silicon oxide, which is mainly used in a semiconductor process; and a method for fabricating a semiconductor device using such an etchant. As used herein, the term "titanium material" refers to both titanium and titanium oxide.

2. Description of the Related Art

Recently, titanium materials have been a target of attention as materials for a semiconductor device. Specifically, titanium has become increasingly important as a metal material usable for interconnects of a semi-conductor circuit or for silicifying metal. Ceramic materials containing titanium oxide has a high dielectric constant and thus is used for memories and capacitors in GaAs high-frequency integrated circuits. Recently, integrated circuits including a capacitor formed of a material having a high dielectric constant such as, for example, $BaSrTiO_3$ or $SrTiO_3$ have been actively developed.

Conventionally, conventional titanium materials are generally etched by ion milling. FIGS. 5A through 5E show a method for processing a material for a capacitor having a high dielectric constant by ion milling.

As shown in FIG. 5A, a lower electrode layer 2, a layer of a material used for a capacitor having a high dielectric constant (hereinafter, referred to as the "high dielectric constant capacitor material layer") 3, and an upper electrode layer 4 are sequentially formed on a substrate 1. As shown in FIG. 5B, a resist mask 5 is formed on the upper electrode layer 4. Then, as shown in FIG. 5C, the upper electrode layer 4 and the high dielectric constant capacitor material layer 3 are patterned by ion milling, thereby forming an upper electrode 4a. Standard conditions of ion milling include an accelerating voltage of 800 V and a beam current of 200 mA. Then, the resist mask 5 is removed. As shown in FIG. 5D, a resist mask 6 is formed on the lower electrode layer 2 so as to cover the high dielectric constant capacitor material layer 3 and the upper electrode 4a. The lower electrode layer 2 is patterned by ion milling as shown in FIG. 5E, thereby forming a lower electrode 2a. Then, the resist mask 6 is removed.

U.S. Pat. No. 4,759,823 discloses a two-step wet etching method used for PLZT. According to such a method, PLZT is immersed in a solution containing HCl and an F ion donor, and then immersed in nitric acid or acetic acid.

Ion milling which is performed for processing a titanium material can disadvantageously damage a semiconductor device due to Ar ions having a high energy. Ion milling has another problem of restricting the selection of the combination of the material to be milled and the material of an underlying layer. The wet etching method mentioned above also has the problem of significantly restricting the selection of the combination of the material to be etched and the material of an underlying layer formed of, for example, silicon oxide.

SUMMARY OF THE INVENTION

An etchant for etching at least one of a titanium material and silicon oxide includes a mixed liquid of HCl, $NH_4F$ and $H_2O$.

In one embodiment of the invention, an etchant has a $NH_4F/HCl$ molar ratio of less than one.

In one embodiment of the invention, a method for fabricating a semiconductor device includes the step of etching a titanium material layer formed on a silicon oxide layer using such an etchant.

In one embodiment of the invention, an etchant has a $NH_4F/HCl$ molar ratio of more than one.

In one embodiment of the invention, a method for fabricating a semiconductor device includes the step of etching a silicon oxide layer formed on a titanium material layer using such an etchant.

In one embodiment of the invention, an etchant has a $NH_4F/HCl$ molar ratio of substantially one.

In one embodiment of the invention, a method for fabricating a semiconductor device includes the step of etching a lamination including a titanium material layer and a silicon oxide layer using such an etchant.

Thus, the invention described herein makes possible the advantages of providing an etchant for selectively etching either a titanium material or silicon oxide, or etching both a titanium material and silicon oxide at a substantially equal rate; and a method for fabricating a semiconductor device using such an etchant.

These and other advantages of the present invention will become apparent to those skilled in the art upon reading and understanding the following detailed description with reference to the accompanying figures.

DESCRIPTION OF THE PREFERRED EMBODIMENTS

The entire disclosure of U.S. patent application Ser. No. 09/116,725 filed Jul. 16, 1998 is expressly incorporated by reference herein.

Hereinafter, the present invention will be described by way of illustrative examples with reference to the accompanying drawings.

EXAMPLE 1

An etchant according to the present invention is formed of a mixed liquid of HCl, $NH_4F$ and $H_2O$.

Figure 1:
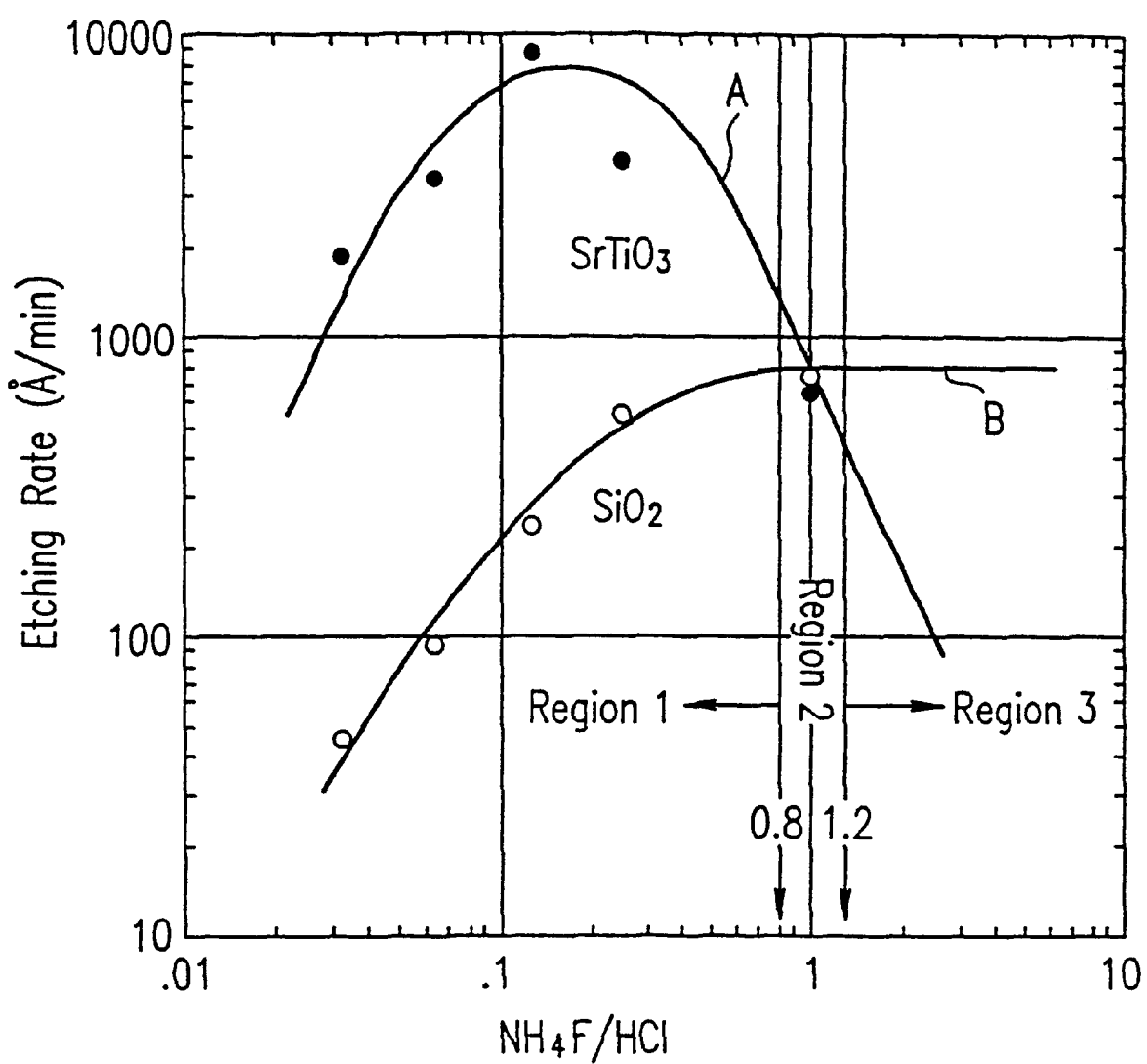
FIG. 1 is a graph illustrating the relationship between the $NH_4F/HCl$ molar ratio of an etchant according to the present invention and the etching rate of $SrTiO_3$ and the silicon oxide layer by the etchant.

FIG. 1 is a graph illustrating the relationship between the $NH_4F/HCl$ molar ratio of an etchant according to the present invention and the etching rate of $SrTiO_3$ and $SiO_2$ by the etchant. $SrTiO_3$ is a representative material among materials containing titanium oxide. Curve A representing the etching rate of $SrTiO_3$ and curve B representing the etching rate of $SiO_2$ cross each other when the $NH_4F/HCl$ molar ratio is one. Substantially the same relationship is exhibited when $Ba_xSr_{(1-x)}TiO_3$ (x: mole fraction), titanium or titanium oxide is used in lieu of $SrTiO_3$. Based on these facts, it is appreciated that either a titanium material or silicon oxide can be selected in accordance with whether the $NH_4F/HCl$ molar ratio is above, below or equal to one.

$SrTiO_3$ and $SiO_2$ in an etchant formed of a mixed liquid of HCl, $HN_4F$ and $H_2O$ react in the following manner.

HCl is electrolytically dissociated as represented by formula (1). $HN_4F$ is electrolytically dissociated as represented by formula (2). The resultant $H^+$ ions and $F^-$ ions react with each other as represented by formula (3), thereby generating $HF_2^-$ ions.

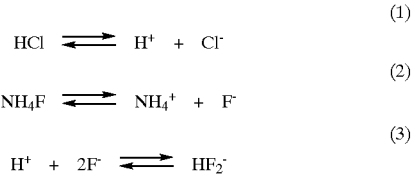

$$HCl \rightleftharpoons H^+ + Cl^- \quad (1)$$
$$NH_4F \rightleftharpoons NH_4^+ + F^- \quad (2)$$
$$H^+ + 2F^- \rightleftharpoons HF_2^- \quad (3)$$

$SrTiO_3$ reacts with the $HF_2^-$ ions and $H^+$ ions as represented by formula (4) and is etched. $SiO_2$ reacts with the $HF_2^-$ ions and $H^+$ ions as represented by formula (5) and is etched.

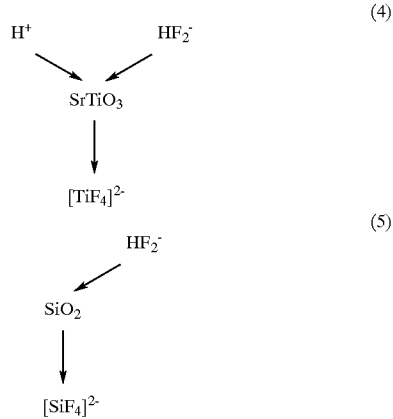

Titanium and titanium oxide can be etched in a similar manner. There are various types of titanium oxide having different valences, any of which can be etched.

Use of the above-mentioned etchant according to the present invention realizes simplification and improvement in the processing precision of semiconductor device fabrication.

EXAMPLE 2

In a second example, a method for fabricating a semiconductor device using an etchant according to the present invention will be described, with reference to FIGS. 2A through 2D. Identical elements previously discussed with respect to FIGS. 5A through 5E bear identical reference numerals and the descriptions thereof will be omitted.

Figure 2A:
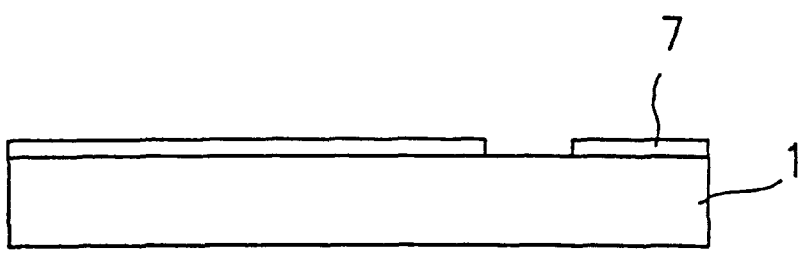
FIGS. 2A through 2D are cross-sectional views illustrating a method for fabricating a semiconductor device in one example according to the present invention.
Figure 2B:
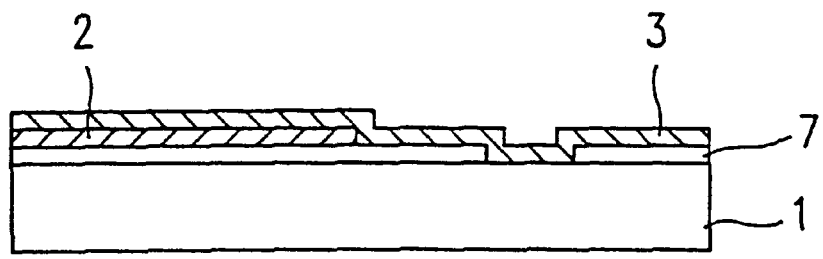
Figure 2C:
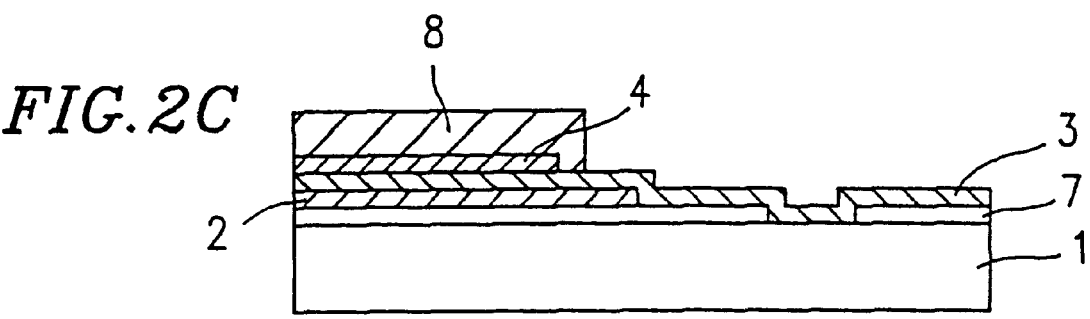

As shown in FIG. 2A, a silicon oxide layer 7 is deposited on a substrate 1 and patterned as prescribed. As shown in FIG. 2B, a lower electrode layer 2 is vapor-deposited thereon and then lifted off. Next, a high dielectric constant capacitor material layer 3 is formed on the substrate 1 so as to cover the silicon oxide layer 7 and the lower electrode layer 2. Then, as shown in FIG. 2C, an upper electrode layer 4 is vapor-deposited thereon and then lifted off. Next, a resist mask 8 for etching the high dielectric constant capacitor material layer 3 is formed on the high dielectric constant capacitor material layer 3 so as to cover the upper electrode layer 4.

Figure 2D:
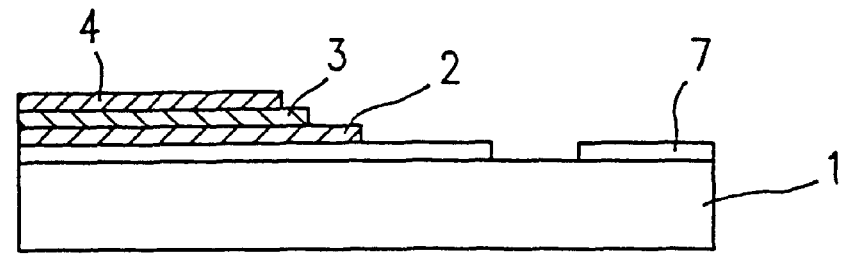

As shown in FIG. 2D, the high dielectric constant capacitor material layer 3 is selectively etched using an etchant which is prepared so as to have a $NH_4F/HCl$ molar ratio of less than one and preferably more than 0.01. Then, the resist mask 8 is removed.

The etching rate of the silicon oxide layer 7 by the etchant is sufficiently slow to prevent any influence on the patterned size and thickness of the silicon oxide layer 7. Thus, the layers are processed in a prescribed manner.

EXAMPLE 3

In a third example, another method for fabricating a semiconductor device using an etchant according to the present invention will be described, with reference to FIGS. 3A through 3D. Identical elements previously discussed with respect to FIGS. 2A through 2E bear identical reference numerals and the descriptions thereof will be omitted.

Figure 3A:
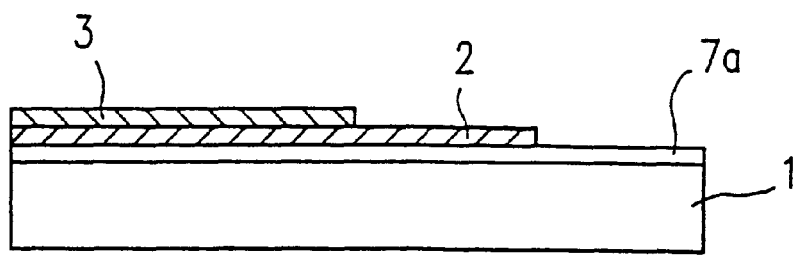
FIGS. 3A through 3D are cross-sectional views illustrating a method for fabricating a semiconductor device in another example according to the present invention.
Figure 3B:
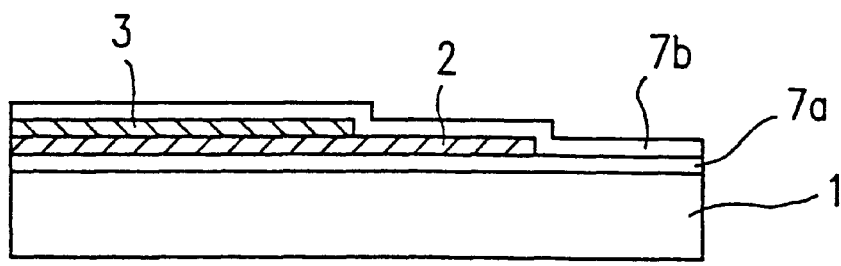
Figure 3C:
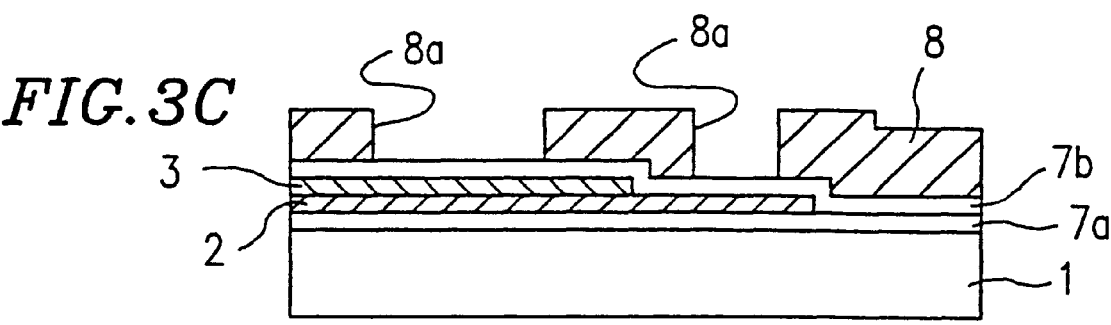

As shown in FIG. 3A, a first silicon oxide layer 7a is deposited on a substrate 1, and then a lower electrode layer 2 and a high dielectric constant capacitor material layer 3 are sequentially formed on the silicon oxide layer 7a. As shown in FIG. 3B, a second silicon oxide layer 7b is deposited on the first silicon oxide layer 7a so as to cover the lower electrode layer 2 and the high dielectric constant capacitor material layer 3. As shown in FIG. 3C, a resist mask 8 for forming holes 8a in the second silicon oxide layer 7b is formed, through which interconnects will be described.

Figure 3D:
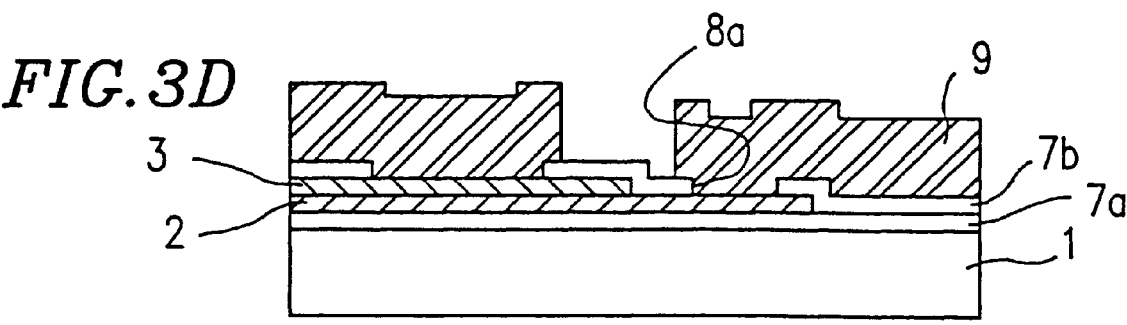

As shown in FIG. 3D, the second silicon oxide layer 7b is selectively etched using an etchant which is prepared so as to have a $NH_4F/HCl$ molar ratio of more than one and preferably less than ten, thereby forming the holes 8a. After the resist mask 8 is removed, an interconnect material layer 9 is formed on the second silicon oxide layer 7b so as to fill the holes 8a.

The etching rate of the capacitor material by the etchant is sufficiently slow to prevent any etching of the capacitor material layer 3 during the selective etching of the second silicon oxide layer 7b. The interconnect material layer 9 acts as an upper electrode layer.

EXAMPLE 4

In a fourth example, still another method for fabricating a semiconductor device using an etchant according to the present invention will be described, with reference to FIGS. 4A through 4D. Identical elements previously discussed with respect to FIGS. 3A through 3E bear identical reference numerals and the descriptions thereof will be omitted.

Figure 4A:
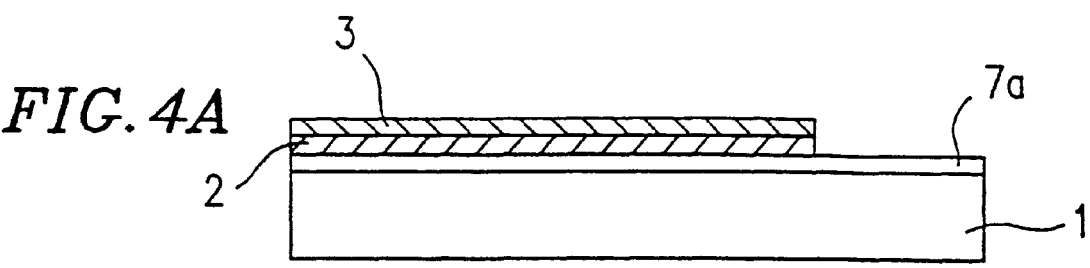
FIGS. 4A through 4D are cross-sectional views illustrating a method for fabricating a semiconductor device in still another example according to the present invention.
Figure 4B:
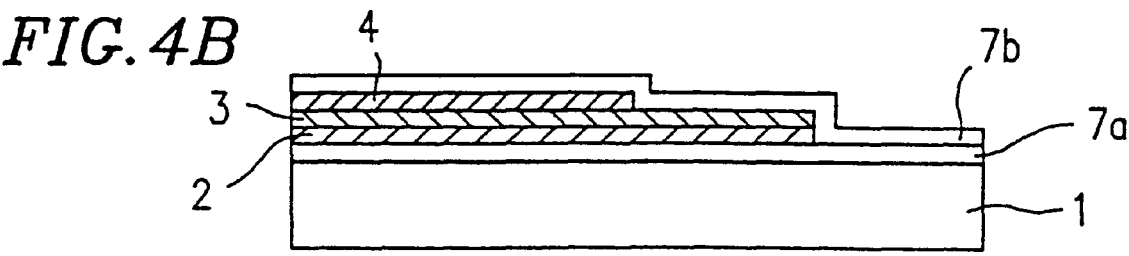
Figure 4C:
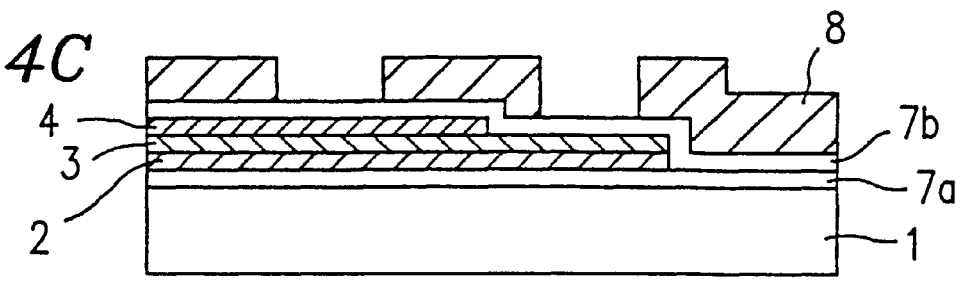

As shown in FIG. 4A, a first silicon oxide layer 7a is deposited on a substrate 1, and then a lower electrode layer 2 and a high dielectric constant capacitor material layer 3 are sequentially formed on the silicon oxide layer 7a. As shown in FIG. 4B, an upper electrode layer 4 is vapor-deposited thereon and then lifted off. Then, a second silicon oxide layer 7b is deposited on the first silicon oxide layer 7a so as to cover the lower electrode layer 2, the high dielectric constant capacitor material layer 3 and the upper electrode layer 4. As shown in FIG. 4C, a resist mask 8 for etching the second silicon oxide layer 7b and the high dielectric constant capacitor material layer 3 is formed on the second silicon oxide layer 7b.

Figure 4D:
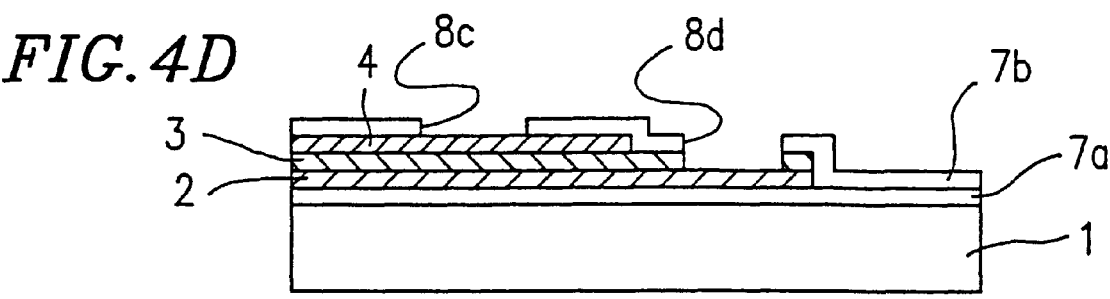
Figure 5A:
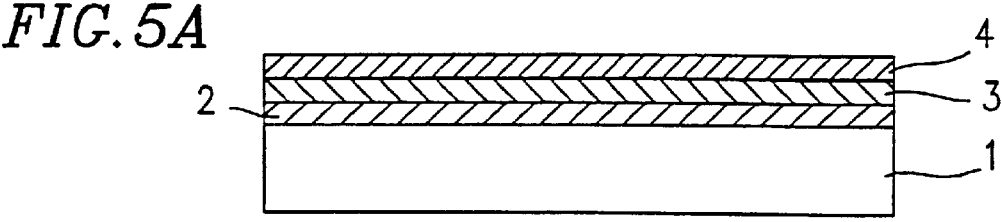
FIGS. 5A through 5E are cross-sectional views illustrating a method for fabricating a conventional semiconductor device.
Figure 5B:
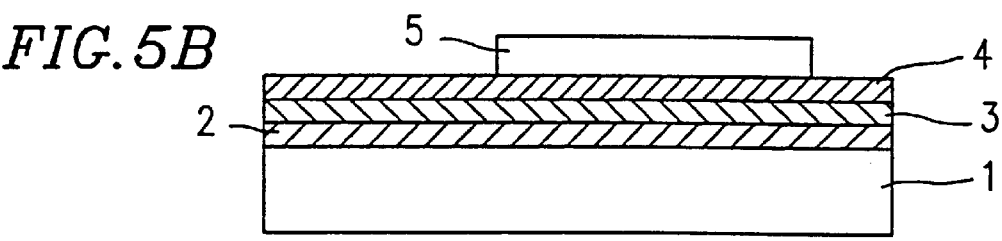
Figure 5C:
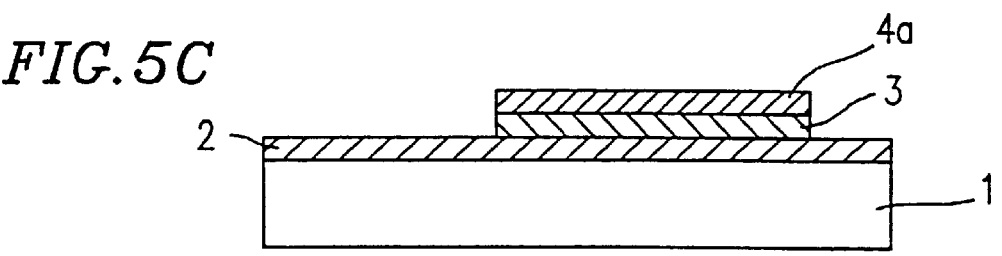
Figure 5D:
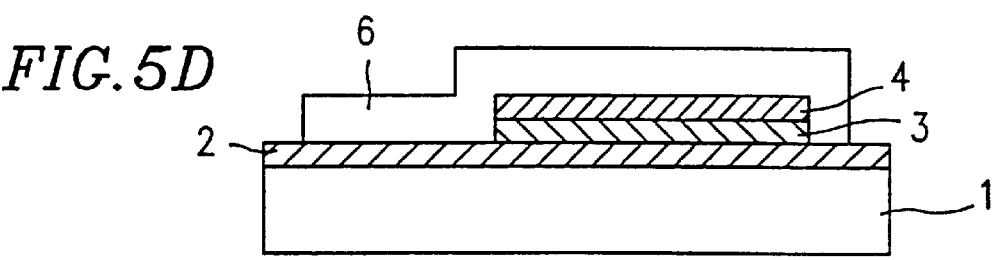
Figure 5E:
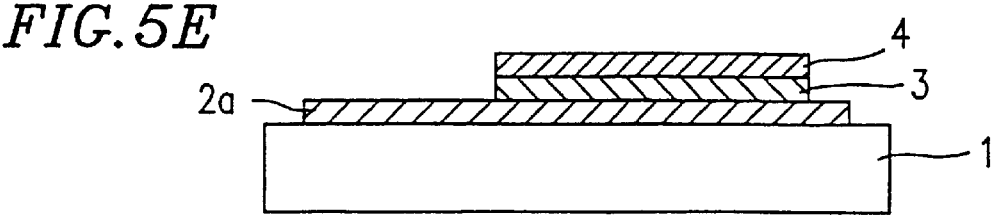

Exposed areas of the second silicon oxide layer 7b and areas of the high dielectric constant capacitor material layer 3 below the exposed areas of the second silicon oxide layer 7b are etched in one step as shown in FIG. 4D, using an etchant which is prepared so as to have a $NH_4F/HCl$ molar ratio of substantially one, preferably between 0.8 and 1.2. Thus, a contact window 8c for the upper electrode layer 4 and a contact window 8d for the lower electrode layer 2 are formed. Then, the resist mask 8 is removed.

Since the etching rate of the second silicon oxide layer 7b and the etching rate of the high dielectric constant capacitor material layer 3 by the etchant are substantially equal, the contact windows 8c and 8d are formed substantially simultaneously. The $NH_4F/HCl$ molar ratio has a production tolerance of about ±20%. It is proper to regard that the second silicon oxide layer 7b and the high dielectric constant capacitor material layer 3 are etched at a substantially equal rate when the tolerance is about ±20%.

As described above, either one of a titanium material or silicon oxide is selectively etched, or both a titanium material and silicon oxide are etched substantially simultaneously, by appropriately setting the $NH_4F/HCl$ molar ratio of an etchant according to the present invention.

When used in fabrication of a semiconductor device, the etchant according to the present invention realizes the simplification and improvement in processing precision.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for fabricating a semiconductor device, comprising the steps of:

etching at least one of a titanium material layer and a silicon oxide layer using an etchant, wherein said titanium material layer includes at least one material selected from the group consisting of $BaTiO_3$, $SrTiO_3$, $Ba_xSr_{(1-x)}TiO_3$, and similar Group IIA metal titanates, and wherein the etchant includes a mixed liquid of HCl, $NH_4F$ and $H_2O$; and setting a molar ratio of $NH_4F/HCl$ in the mixed liquid, the molar ratio being set based on which of the at least one of the titanium material layer and the silicon oxide layer is to be etched.

2. A method for fabricating a semiconductor device according to claim 1, wherein the step of setting a molar ratio of $NH_4F/HCl$ includes setting the molar ratio of $NH_4F/HCl$ to less than 1 in the case where the titanium material layer is to be etched.

3. A method for fabricating a semiconductor device according to claim 1, wherein the step of setting a molar ratio of $NH_4F/HCl$ includes setting the molar ratio of $NH_4F/HCl$ to more than 1 in the case where the silicon oxide layer is to be etched.

4. A method for fabricating a semiconductor device according to claim 1, wherein the step of setting a molar ratio of $NH_4F/HCl$ includes setting the molar ratio of $NH_4F/HCl$ in a range from about 0.8 to about 1.2 in the case where both the titanium material layer and the silicon oxide layer are to be etched.

* * * * *